(12) United States Patent
Emonin

(10) Patent No.: US 11,242,887 B2
(45) Date of Patent: Feb. 8, 2022

(54) CARABINER WITH INTERNAL CONFINEMENT ELEMENT

(71) Applicant: ZEDEL, Crolles (FR)

(72) Inventor: Simon Emonin, Grenoble (FR)

(73) Assignee: ZEDEL, Crolles (FR)

( * ) Notice: Subject to any disclaimer, the term of this patent is extended or adjusted under 35 U.S.C. 154(b) by 1 day.

(21) Appl. No.: 16/852,712

(22) Filed: Apr. 20, 2020

(65) Prior Publication Data

US 2020/0332827 A1 Oct. 22, 2020

(30) Foreign Application Priority Data

Apr. 19, 2019 (FR) .................................. 1904249

(51) Int. Cl.
*F16B 45/02* (2006.01)
*A63B 29/02* (2006.01)

(52) U.S. Cl.
CPC .............. *F16B 45/02* (2013.01); *A63B 29/02* (2013.01)

(58) Field of Classification Search
CPC ...... A62B 35/0037; A62B 29/02; F16B 45/02
See application file for complete search history.

(56) References Cited

U.S. PATENT DOCUMENTS

| | | | |
|---|---|---|---|
| 4,019,609 A * | 4/1977 | Wagner ................... | A62B 1/06 188/65.4 |
| 5,384,943 A | 1/1995 | LeFebvre et al. | |
| D467,156 S * | 12/2002 | Bishop ........................... | D8/356 |
| 2007/0062013 A1* | 3/2007 | Mueller .................. | F16B 45/02 24/599.1 |
| 2007/0130734 A1* | 6/2007 | Handel ...................... | B62J 7/08 24/599.1 |
| 2008/0301917 A1* | 12/2008 | Lee ......................... | F16B 45/00 24/599.1 |
| 2016/0281766 A1 | 9/2016 | Moine et al. | |
| 2018/0283439 A1* | 10/2018 | Jones .................. | A62B 35/0043 |

FOREIGN PATENT DOCUMENTS

| | | |
|---|---|---|
| FR | 2 694 203 A1 | 2/1994 |
| GB | 1 229 857 A | 4/1971 |
| JP | 2007-046743 A | 2/2007 |

\* cited by examiner

*Primary Examiner* — Robert Sandy
*Assistant Examiner* — Michael S Lee
(74) *Attorney, Agent, or Firm* — Oliff PLC

(57) ABSTRACT

The carabiner comprises a body associated with a gate able to rotate on a first end of the body between a closed position and an open position of the carabiner. A confinement element is configured to form a first stop and a second stop salient from the body. The confinement element is fitted removable with respect to the body. The confinement element is fixed to the body by a first fastener and a second fastener. A joining part connects the first fastener to the second fastener to define the space separating the first stop and the second stop. The joining part is pressed against the body. The body, the gate and the joining part define a carabiner with a single central ring.

18 Claims, 3 Drawing Sheets

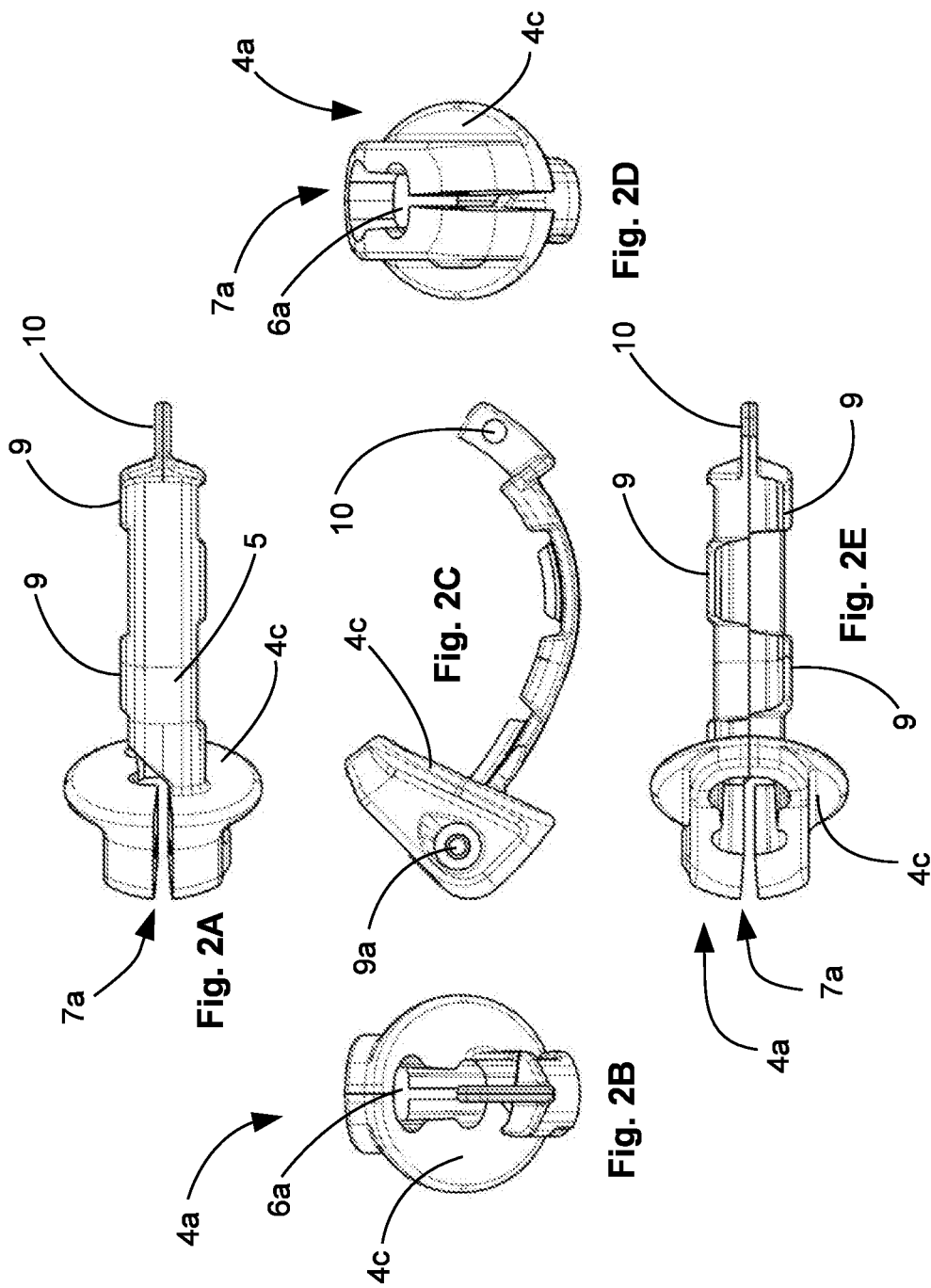

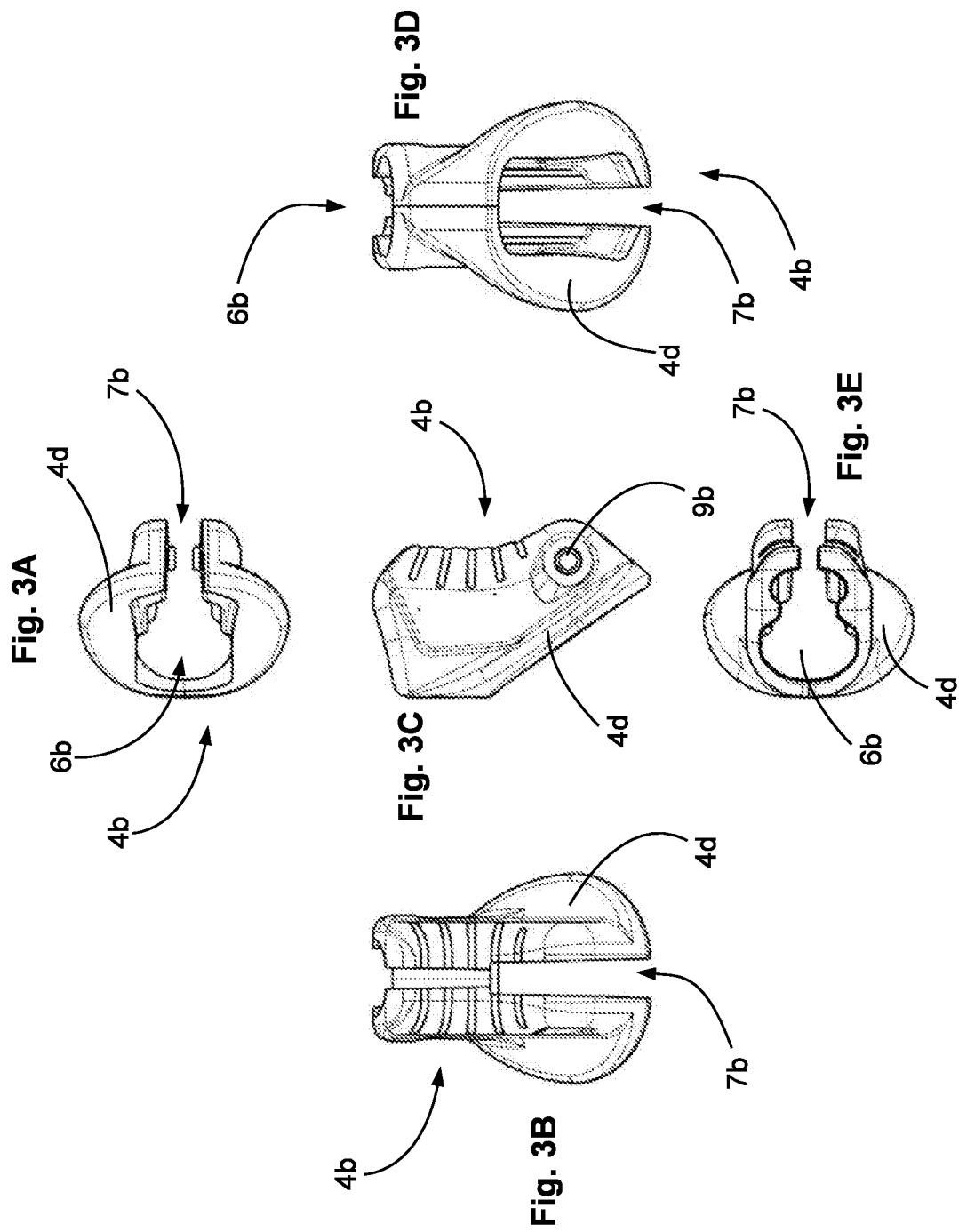

CARABINER WITH INTERNAL CONFINEMENT ELEMENT

BACKGROUND OF THE INVENTION

The invention relates to a carabiner used in the field of climbing and work at height.

PRIOR ART

Carabiners are commonly used in the climbing field and for professional activities where it is necessary to be roped up. They are used for example to connect a safety device to the hasp of a roping harness or to a rock face.

Carabiners are generally of asymmetric shape, one area of the carabiner being specially designed to collaborate with a safety device whereas another area is more suitable for the use of a rope for example.

However, in the course of use, it is not uncommon for the carabiner to flip, for example when a user is belaying another climber on a rock face. When belaying is performed, the belay system composed of the carabiner and safety device does in fact move as the user slides the safety device along the belay rope. The relative position of the safety device with respect to the carabiner may thereby be modified and adversely affect satisfactory operation of the belay system.

To overcome this problem, some carabiners are provided with a separating bar fitted in fixed manner to the carabiner to separate the space defined inside the carabiner into two distinct areas. The purpose of the bar is to prevent movement of a device—for example a safety device—beyond the area defined by the bar.

Some carabiners have a bar fitted so as to be able to rotate with respect to the body of the carabiner. The bar is used as a lock to prevent unintentional opening of the carabiner gate. This type of device does however present the drawback of being bulky and of not being practical as there is no longer any separation of the space defined inside the carabiner when the latter is in the open position. As the bar is fitted so as form a lock, the areas defined in the carabiner are not optimised.

Other carabiners provided with a bar are known. Some bars are secured to the carabiner via one of their ends, for example by inserting at least one of the ends in a hole made in the carabiner body. As one or more openings have been made in the carabiner, the latter may be weakened and specific precautions have to be taken to implement its manufacturing process.

The bar can in some cases be coupled to a spring biasing it to return to a predefined position after it has been moved.

When the bar is fixed to the body of the carabiner via one of its ends only, connecting a device up to the carabiner is made easier, but the drawback is that this device may also inadvertently come out of the area predefined by the bar.

Making a hole in the carabiner to house the end of the bar may also be prejudicial as it may in fact result in weakening of the latter if it is not performed with a suitable degree of precision.

It is also known from the document US 2016/0281766 to provide a carabiner equipped with a removable bar defining two complementary spaces dissociated from one another inside the inner surface of the carabiner. The bar is a single part that is fastened to the body of the carabiner in two distinct areas, for example by clip-fastening.

This results in this configuration not being practical for certain uses.

OBJECT OF THE INVENTION

One object of the invention consists in providing a carabiner configured to collaborate with a safety device kept permanently in a predefined area of the carabiner and allowing a greater freedom of movement, in particular enabling the safety device to be fitted and/or dismantled. For this purpose, the carabiner comprises:
  a body,
  a gate fitted so as to be able to rotate on a first end of the body between a closed position and an open position of the carabiner, the gate being in contact with a second end of the body when the carabiner is in the closed position,
  a confinement element configured to form a first stop and a second stop salient from the body, the confinement element being fitted removable with respect to the body, the confinement element being fixed to the body by a first fastener and a second fastener,
  a joining part connecting the first fastener to the second fastener to define the separating distance between the first stop and the second stop.

The carabiner is remarkable in that the joining part is pressed against the body. The body, gate and joining part define a carabiner with a single central ring.

Preferentially, the first fastener and/or second fastener completely surround the body.

According to a development of invention, the joining part is only in contact with an outer surface of the body between the first fastener and the second fastener.

In advantageous manner, the second fastener is fitted removable with respect to the first fastener and with respect to the joining part.

Preferentially, the first fastener is monolithic with the joining part. The second fastener defines a through hole collaborating with a second through hole defined in the joining part, a connection part passing through the through hole and the second through hole to form a single-piece confinement element.

In a particular embodiment, the joining part is shaped to reproduce the shape of the outer surface of the body in a curved part of the body, the joining part being pressed against the curved part of the body.

According to one development, the first fastener, second fastener and joining part are made from polymer material.

In a preferential embodiment, the first fastener and second fastener each define a through hole collaborating with first and second connection parts chosen from screws, rivets or crimp pins to close the first and second fasteners.

Advantageously, the first and/or second fasteners are provided with an anti-rotation device relatively to the body.

It is advantageous to provide a carabiner wherein the first and/or second fasteners respectively comprise first and second recesses having a complementary shape to that of the body.

It is a further object of the invention to provide a belay system that comprises a carabiner according to one of the foregoing configurations and a belay device.

It is yet a further object of the invention to provide a method for fitting a safety device on a carabiner that is easy to implement.

According to the invention, this object is achieved by method successively comprising:

provided a carabiner, a safety device and a confinement element, the confinement element having a first fastener, a second fastener and a joining part, the first or second fastener being fixed to the body of the carabiner, inserting the body of the carabiner in a connection hole of the safety device until a work area is reached, fixing the other of the first or second fastener to the body of the carabiner, the first and second fastener defining first and second stops at the ends of the work area, the first and second fasteners being fixed to one another by a joining part pressing on the body.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which:

FIGS. 2A, 2B, 2C, 2D and 2E schematically represent different views of a first fastener associated with a joining part;

FIGS. 3A, 3B, 3C, 3D and 3E schematically represent different views of a second fastener.

DESCRIPTION OF THE EMBODIMENTS

Figure 1:
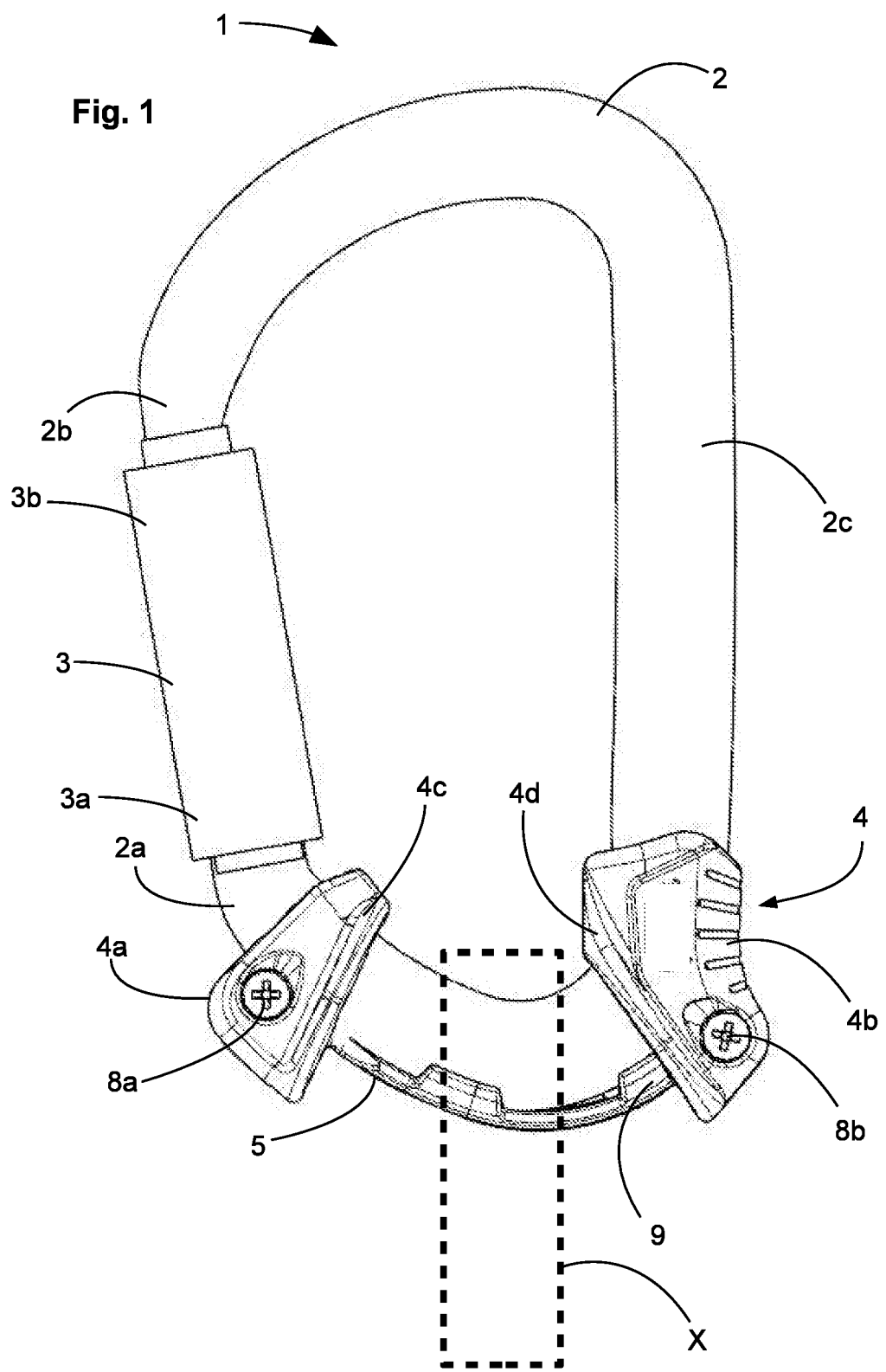
FIG. 1 schematically illustrates a carabiner according to the invention provided with a confinement element of a work area.

Carabiners used in the climbing field serve the purpose of connecting at least two devices to one another to ensure user safety. They can for example serve the purpose of connecting the hasp of a roping harness and a belay device.

A carabiner 1, such as the one represented in FIG. 1, comprises a C-shaped body 2 advantageously made from metal and a rotatable gate 3 designed to close carabiner 1. A first end 3a of gate 3 is fitted in rotatable manner on a first end 2a of body 2. Gate 3 is fitted rotatable by means of a shaft the longitudinal axis of which is orthogonal to a plane called mid-plane of the carabiner. When movement of gate 3 takes place with respect to body 2, gate 3 moves in the mid-plane.

A second end 3b of gate 3 is in contact with a second end 2b of body 2 when carabiner 1 is in the closed position. Gate 3 can also take several open positions to enable a safety device X or a rope for example to be inserted. The maximum opening position corresponds to the position where second end 3b of gate 3 can touch a central part 2c of body 2 or corresponds to the minimum distance between end 3b and central part 2c. A return spring (not shown) biases gate 3 to the closed position of carabiner 1 so that, without the application of an external force, carabiner 1 is in the closed position.

In general manner, the shape of a carabiner 1 as represented in the mid-plane and in FIG. 1 is designed for a given use and generally does not present a plane of symmetry that is secant to the previously defined plane. Connection between a carabiner 1 and a safety device X, for example a belay device, therefore has to be performed in a specific area of carabiner 1 in order to use the latter under optimum safety conditions. For example it is particularly advantageous to make the carabiner work along its major axis to avoid placing a strain on gate 3.

To make the carabiner work along its preferential axis, it is known to confine the safety device in a predefined area by means of a metal bar fixed to body 2 of carabiner 1. The bar, in conjunction with body 2 and gate 3, then defines two adjacent and distinct spaces inside the ring defined by body 2 and gate 3. In this way, safety device X is confined in an inner space of carabiner 1.

This has the result that, when safety device X is large, it cannot always fit into the work space defined by the bar and carabiner body 2 which means that another carabiner has to be used. It may also happen that safety device X does not define an openable connection hole. Safety device X then has to be fitted by opening the carabiner gate and then fitting the bar in place afterwards. This operation can be tedious when the bar is removable and proves to be impossible otherwise.

It is therefore particularly advantageous to provide a carabiner 1 provided with a confinement element 4 defining an area in which safety device X will be able to move on a part of body 2 without confinement element 4 defining a closed area requiring prior removal of confinement element 4 in order to install safety device X. In other words, the confinement element does not define a carabiner with a bar.

Confinement element 4 is secured to body 2 by means of a first fastener 4a and a second fastener 4b distinct from first fastener 4a. Confinement element 4 defines a first stop 4c and a second stop 4d distinct from first stop 4c. In advantageous manner, first fastener 4a forms first stop 4c and second fastener 4b forms second stop 4d.

First and second stops 4c and 4d are salient from body 2 to define the ends of a work area of safety device X along the body. In other words, in operation, body 2 passes through a connection hole of safety device X and the two stops hamper or prevent movement of safety device X along body 2 beyond the stop.

In advantageous manner, at least one stop has a shape that collaborates with the shape of the connection hole to allow insertion of safety device X in the work area and extraction of the latter from the work area. The stop complicates the passage of safety device X without actually preventing same, for example by imposing a predefined angular position for insertion in or extraction from the work area. The two stops are salient from the body and are directed towards the inside of the carabiner. The two stops have free tops, i.e. without any mechanical connection with another part of the carabiner.

In a particular embodiment, the two stops have a shape that collaborates with the shape of the connection hole to allow insertion in and extraction from the work area. It is then possible to install and remove a safety device without having to disassemble the confinement element. Preferentially, a single stop enables extraction and insertion of the safety device. The stop enabling insertion and extraction can be the stop closest to gate 3 or the stop farthest from the gate.

Confinement element 4 does not prevent opening of gate 3 and does not form a lock preventing opening of gate 3. As the confinement element does not define a bar inside the ring of carabiner 1, any safety device X having a smaller width than the width of the work area can be fitted, and the height from the connection hole with respect to the height of the bar no longer has to be taken into consideration.

In operation, safety device X will press on one or the other of stops 4c and 4d making stop 4c/4d move along body 2. When it moves, stop 4c/4d will increase the work area and will end up by allowing flipping of carabiner 1 which can then work outside the required configuration. One of stops 4c/4d can also totally or partially prevent opening of gate 3.

To prevent movement of stops 4c/4d along body 2, it is advantageous to secure first stop 4c with second stop 4d. It is particularly advantageous to use a joining part 5 that connects first stop 4c to second stop 4d. Joining part 5 defines the separating distance between first stop 4c and second stop 4d, i.e. the work area along body 2. Joining part 5 covers a curved portion of body 2 so as not to define a bar. Advantageously, joining part 5 only covers the curved portion of body 2. The two stops define a work area that corresponds to a curved portion of body 2.

When safety device X presses on one of stops 4c and 4d, joining part 5 acts in such a way that the other stop it is also subjected to the force and opposes the movement. As confinement element 4 are formed in a single piece, the friction forces with body 2 are increased thereby making it easier to keep the two stops 4c and 4d in place.

To install or remove safety device X, it may be necessary to slide the latter between the work area and the opening of the carabiner, i.e. the space between gate 3 and body 2 when gate 3 is open. To enable safety device X to slide along the carabiner, it is important for safety device X not to be enclosed in a closed loop dissociated from the gate as is the case in prior art carabiners with a bar.

Joining part 5 connecting first and second stops 4c and 4d does not define a ring inside the ring formed by body 2. Joining part 5 does not oppose movement of safety device X along body 2.

Whereas in configurations of the prior art the bar of the carabiner presses on two different points of the body to divide the inner surface of the carabiner into two complementary surfaces, according to the invention joining part 5 does not act as a bar and does not confine two distinct spaces in the inner space of the carabiner.

In the embodiment illustrated in FIG. 1, joining part 5 is completely located outside the inner space of the carabiner. Joining part 5 only covers the outer surface of body 2 to connect the two stops 4c and 4d. It is advantageous for joining part 5 to be pressed against body 2.

This configuration is particularly advantageous as safety device X presses on body 2 of the carabiner as in a standard configuration. Safety device X does not force joining part 5 to press against body 2.

In an alternative embodiment, joining part 5 only covers the inner surface of body 2 to connect the two stops. It is advantageous for joining part 5 to be pressed against body 2. In this case, the user is not incited to install safety device X or any other item between body 2 and joining part 5.

When joining part 5 is located inside the ring defined by body 2, joining part 5 can define a work surface having a different texturing from that proposed by body 2. The work surface enables for example sliding of safety device X to be reduced. The work surface defined by joining part 5 covers the surface of body 2 designed to be in contact with safety device X.

In another embodiment, joining part 5 can partially cover the inner surface and partially cover the outer surface of body 2 to connect the two stops.

First and second fasteners 4a and 4b are connected by joining part 5. To enhance securing of confinement element 4 on body 2, first fastener 4a and second fastener 4b are configured to prevent rotation of confinement element 4 with respect to body 2.

For optimum securing of confinement element 4, it is advantageous to provide for at least first fastener 4a or second fastener 4b to completely surround body 2, i.e. to form a ring around a section of body 2.

In a particular embodiment, the two fasteners 4a and 4b each form a ring and rotation of confinement element 4 is impossible. Rotation is also impossible when the ring is not complete but is sufficiently covering to prevent operation of clipping type on the body. By completely surrounding body 2, confinement element 4 is more rugged and its lifetime is improved.

It is particularly advantageous to provide for the cross-section of body 2 not to be circular and for first fastener 4a and/or second fastener 4b to define a shape that collaborates with the non-circular cross-section to form an anti-rotation device of first stop 4c and second stop 4d with respect to body 2. It is particularly advantageous to provide for first fastener 4a and/or second fastener 4b to define a complementary shape to the cross-section of body 2 to prevent rotation. FIGS. 2A-2E and 3A-3E schematically illustrate an embodiment of the first fastener defining the first stop and the second fastener defining a second stop. FIGS. 2B, 2D and 2E illustrate a first fastener defining an inner section housing body 2 which is non-circular. FIGS. 3A, 3D and 3E illustrate a second fastener defining an inner section housing body 2 which is non-circular.

In an advantageous configuration, first fastener 4a and/or second fastener 4b are in the form of an openable shell. The shell defines a ring that opens to allow insertion of body 2 in the shell. In advantageous manner, the shell defines two half-rings that are fitted movable with respect to one another to open the shell when body 2 is inserted in or extracted from the shell. What is meant by half-shell is advantageously a part that represents half of the shell or substantially half of the shell. It is also possible for a half-shell to represent less than half of the shell and for the other half-shell to represent the complement.

First fastener 4a advantageously defines a first recess 6a and a first insertion opening 7a designed to allow insertion of body 2 until it reaches first recess 6a. In like manner, it is advantageous to provide for second fastener 4b to define a second recess 6b and a second insertion opening 7b enabling body 2 to be inserted in second recess 6b as illustrated in the different views of FIGS. 2A-2E and the different views of FIGS. 3A-3E. These two fasteners are both advantageously configured to clip onto body 2 by elastic deformation. Advantageously, first and second insertion openings 7a and 7b are defined by slots in a ring completely surrounded by body 2. These two slots define two planes that are preferentially coplanar. The slots are illustrated in FIGS. 2A, 2D and 2E and in FIGS. 3A, 3B, 3D and 3E.

In advantageous manner, first and/or second fasteners 4a and 4b are configured to deform plastically thereby allowing body 2 to be inserted through the slot.

The use of a first and/or second fastener 4a, 4b that is provided with a slot and is deformable is particularly advantageous as it facilitates formation of a single-piece confinement element.

If a slot is used, it is particularly advantageous to place this slot facing the outer part of body 2 of the carabiner, i.e. in the outer part of the space confined by body 2. It was observed that locating the slot on the inner part of metal body 2 results in accelerated weakening of the fasteners as the slot undergoes a large number of knocks with safety device X during use.

In the closed position, it is advantageous to provide for the two sides of the slot to be in contact to achieve an enhanced strength.

To avoid any untimely opening of first and/or second fasteners 4a/4b of confinement element 4 on body 2, each insertion opening 7a and 7b can be kept closed by at least one connection part 8a/8b (cf. FIG. 1). This connection part can for example be a clamp clamping the outer surfaces of bar 4 near insertion openings 7a and 7b (embodiment not represented). In the illustrated embodiment a screw closes the two fasteners 4a and 4b.

In advantageous manner, first and/or second through holes 9a and 9b can be made near first and second insertion openings 7a and 7b so that first and/or second connection parts 8a and 8b (cf. FIG. 1) such as screws, rivets or crimp pins can collaborate with first and second through holes 9a and 9b and prevent unintentional opening of insertion openings 7a and 7b and secure confinement element 4 firmly on body 2. In a particular embodiment, first and second connection parts 8a and 8b extend over the whole length of first and second through holes 9a and 9b. First and second through holes 9a and 9b can also have axes of revolution orthogonal respectively to first and second insertion openings 7a and 7b. When insertion openings 7a and 7b are coplanar, first and second through holes 9a and 9b can be orthogonal to this plane.

Closing of first and second insertion openings 7a and 7b enables confinement element 4 to be firmly secured on body 2 and prevents any undesirable unclipping that may lead to improper use of safety device X connected to carabiner 1.

As an alternative embodiment which can be combined with the previous embodiments, fastener 4a/4b provided with a deformable insertion opening, for example a slot, can also be provided with a clipping system with a salient area formed on a first side of the slot and a hole formed on the second side of the slot and collaborating with the salient area to perform closing of the slot by clip-fastening. The clipping system can be configured to form a hard spot making it easier to keep the closed position or to perform closing of the fastening means in definitive manner.

In an alternative embodiment, first fastener 4a or second fastener 4b is formed by a ring devoid of any means for opening said ring. In this specific case, the ring is not deformable and this fastener is fitted first in the carabiner. The other fastener is an openable part enabling insertion of body 2.

First and/or second fasteners 4a, 4b can comprise anti-rotation means with respect to body 2. In this way, fastener 4a/4b intrinsically opposes rotation of confinement element 4 without particularly applying any force on the joining part or the opposite fastener.

The use of one or two fasteners provided with anti-rotation means enhances the strength of confinement element 4.

In an advantageous embodiment, the shape of first and/or second recesses 6a and 6b can be complementary to that of body 2. This can be particularly advantageous when the cross-section of body 2 is not circular, as in the embodiment illustrated in the different views of FIGS. 2A-2E and 3A-3E. It should also be noted that fasteners 4a and 4b do not press on gate 3.

In an alternative embodiment, the anti-rotation means is configured to allow rotation in an angular range substantially equal to 10° so as to enable the confinement element to be fitted on a larger number of carabiners.

After it has been fitted in position in first and second recesses 6a and 6b, body 2 is surrounded by first and second fasteners 4a and 4b. The latter present the property of preventing rotation of confinement element 4 with respect to body 2. To achieve this, the inside of first and second recesses 6a and 6b can for example be covered by a non-slip film or by roughnesses designed to prevent any movement of confinement element 4 relatively to body 2.

To enhance the strength of confinement element 4, it is particularly advantageous to provide for first fastener 4a to define a contact area collaborating with body 2 to enable or prevent first fastener 4a from being placed at certain locations of body 2 and on gate 3. The shape of first recess 6a and/or the shape of second recess 6b are advantageously configured so as to allow first fastener 4a and/or second fastener 4b to only be fitted in a curved area of body 2. This configuration prevents a fastener from being fitted in the straight area which is an area where it is difficult to prevent movement along body 2. It is advantageous to use a body 2 with variable radiuses of curvature. By defining the required radius of curvature in the recesses, it is possible to impose the position of first fastener 4a and second fastener 4b on body 2 and to limit movement along body 2.

In an alternative embodiment, body 2 can be provided with one or more salient areas that will prevent sliding of first fastener 4a or second fastener 4b along body 2. However, this configuration is not preferential as it means that the shape of the surface of the body has to be modified.

As illustrated in FIG. 1 and in FIG. 2C, it is particularly advantageous to provide for joining part 5 to present a shape reproducing the shape of a curved part of body 2. In this way, application of a force on one of the fasteners in order to move the latter results in application of a force on the other fastener and in application of a force seeking to deform joining part 5. This configuration makes movement of confinement element 4 by safety device X very difficult.

In the illustrated embodiment, joining part 5 covers the outer surface of body 2 and defines edges 9 opposing sliding of joining part 5 around body 2 or transversely with respect to body 2. Edges 9 prevent joining part 5 from being transversely stressed. The same may be the case when the joining part only covers the inner surface of body 2.

As illustrated in FIG. 1, body 2 defines a general C-shape in the mid-plane. It is however advantageous for body 2 to have a straight area facing gate 3 generally forming central area 2c facing gate 3. The straight area and gate 3 are joined by two curved areas. II is particularly advantageous for first fastener 4a to be configured to prevent it from sliding in the straight area by means of recess 6a. The same is advantageously the case for second fastener 4b.

In a particular embodiment, confinement element 4 is monolithic, i.e. first fastener 4a, second fastener 4b and joining part 5 are not able to be disassembled from one another.

However, for ease of fitting of confinement element 4, it is advantageous to be able to separate first fastener 4a and second fastener 4b. In the illustrated embodiment, first fastener 4a and joining part 5 are manufactured in monolithic manner. In an alternative embodiment, the joining part is configured so as to be able to be dismounted from first fastener 4a and second fastener 4b.

It is particularly advantageous to manufacture confinement element 4 in at least two parts but preferentially in two parts. It is possible to install first fastener 4a with first stop 4c or second fastener 4b with second stop 4d on carabiner body 2. Safety device X is then installed in the work area of body 2. Lastly, the other fastener is installed and fixed to the fastener that has already been fitted. In this way, safety device X is housed in the work area and a single fastener is fitted after safety device X has been installed.

This configuration is particularly advantageous when safety device X defines a connection hole that is smaller than first stop 4c and second stop 4d. Once it has been installed in the work area, safety device X can no longer leave the work area on account of the stops. This configuration makes it possible to block the position of safety device X in a part of the carabiner without the presence of a bar. In carabiners with a bar, the bar defines two distinct spaces. A trade-off has to be made between the space defined by the bar to be able to install a piece of equipment and the dimensions of the bar to withstand the mechanical stresses without preventing actuation of gate 3. The illustrated configuration enables the bar to be circumvented. The carabiner defines a functional space by means of body 2 and gate 3, and this space is advantageously a single space. The confinement element forms a blocking means of safety device X in the work area without however forming a carabiner with a bar.

For each fastener 4a, 4b to be able to be clip-fastened without undergoing any plastic deformation liable to weaken it, it is advantageous to choose a material having a suitable fracture strain value, for example at least 50%.

The material forming fastener 4a, 4b is advantageously chosen from injectable thermoplastic materials and more particularly from polyamide. Clip-fastening of fastener 4a, 4b can thus be achieved by elastic deformation of the two fasteners 4a and 4b to install and uninstall the confinement element on body 2.

In advantageous manner, when the joining part can be dismounted from second fastener 4b, it is advantageous for the joining part to have a through hole 10 that collaborates with through hole 9. In this way, when second fastener 4b is closed on connection part 8, connection part 8 also provides the mechanical connection between joining part 5 and second fastener 4b.

The invention also relates to a belay system comprising a safety device X for example a belay device and a carabiner 1 having the characteristics which have been defined in the foregoing. The invention can for example be used in the scope of a professional use for performing rappelling.

For the user to fit safety device X correctly on carabiner 1, the following steps are performed:
 providing safety device X and a carabiner 1 according to any one of the foregoing configurations,
 inserting the body 2 of carabiner 1 through a connection hole of safety device X and sliding safety device X along body 2,
 passing one of the stops through the connection hole of safety device X so that safety device X is located in the work area demarcated by the two stops 4c and 4d.

Safety device X is associated with carabiner 1 after the confinement element have been fitted on body 2 when safety device X defines a non-openable connection hole that is larger than one of the stops.

In another embodiment where safety device X defines a non-openable connection hole that is smaller than one of the two stops, the following steps are performed:
 providing a carabiner 1 according to any one of the foregoing configurations with only one of the fasteners fitted on body 2 of carabiner 1,
 inserting the body 2 of carabiner 1 through a connection hole of safety device X and sliding safety device X along body 2 until it reaches the work area,
 fixing the other fastener on body 2, the first and second fasteners being connected by joining part 5. Safety device X is located in the work area demarcated by the two stops 4c and 4d.

In a last alternative embodiment, the two stops are fixed to body 2 after safety device X has been installed in the carabiner.

To remove safety device X from carabiner 1, the following steps are performed:
 providing safety device X and a carabiner 1 according to any one of the foregoing configurations with safety device X installed in the work area,
 passing one of the stops through the connection hole of safety device X so that safety device X leaves the work area demarcated by the two stops 4c and 4d.
 sliding the safety device X along body 2 until body 2 of carabiner 1 leaves the connection hole of safety device X.

In another embodiment where safety device X defines a non-openable connection hole that is smaller than the two stops, the following steps are performed:
 providing safety device X and a carabiner 1 according to any one of the foregoing configurations with safety device X installed in the work area,
 removing one of the fasteners defining one of the stops and removing safety device X from work area.
 sliding safety device X along body 2 until body 2 of carabiner 1 leaves the connection hole of safety device X.

In a last alternative embodiment, the two fasteners are removed before safety device X is extracted from the carabiner.

These different steps can also be performed for fitting of a safety device X such as a belay device, a lanyard, a pulley or a clamp.

The invention claimed is:

1. Carabiner comprising:
 a body,
 a gate fitted able to rotate on a first end of the body between a closed position and an open position of the carabiner, the gate being in contact with a second end of the body when the carabiner is in the closed position,
 a confinement element configured to form a first stop and a second stop salient from the body, the confinement element being fitted removable with respect to the body, the confinement element being fixed to the body by a first fastener and a second fastener,
 a joining part connecting the first fastener to the second fastener to define a separating distance between the first stop and the second stop, the joining part being pressed against the body, the body, the gate and the joining part defining a carabiner with a single central ring,
 wherein the first fastener and/or second fastener completely surround the body in a section plane such that the first fastener and/or second fastener form a ring around a section of the body.

2. Carabiner according to claim 1, wherein the joining part is only in contact with an outer surface of the body between the first fastener and the second fastener.

3. Carabiner according to claim 1, wherein the joining part is shaped to reproduce the shape of the outer surface of the body in a curved part of the body, the joining part being pressed against the curved part of the body.

4. Carabiner according to claim 3, wherein the first fastener, the second fastener and the joining part are made from polymer material.

5. Carabiner according to claim 1, wherein the first and/or second fasteners are provided with an anti-rotation device relatively to the body.

6. Carabiner according to claim 5, wherein the first and/or second fasteners respectively comprise first and second recesses having a complementary shape to the shape of the body.

7. Belay system comprising a carabiner according to claim 1 and a safety device.

8. Belay system according to claim 7, wherein the safety device is chosen from a belay device, a clamp, a lanyard or a pulley.

9. Carabiner comprising:
a body,
a gate fitted able to rotate on a first end of the body between a closed position and an open position of the carabiner, the gate being in contact with a second end of the body when the carabiner is in the closed position,
a confinement element configured to form a first stop and a second stop salient from the body, the confinement element being fitted removable with respect to the body, the confinement element being fixed to the body by a first fastener and a second fastener,
a joining part connecting the first fastener to the second fastener to define a separating distance between the first stop and the second stop, the joining part being pressed against the body, the body, the gate and the joining part defining a carabiner with a single central ring,
wherein the second fastener is fitted removable with respect to the first fastener and with respect to the joining part.

10. Carabiner according to claim 9, wherein the first fastener is monolithic with the joining part and wherein the second fastener defines a through hole collaborating with a second through hole defined in the joining part, a connection part passing through the through hole and the second through hole to form a single-piece confinement element.

11. Belay system comprising a carabiner according to claim 9 and a safety device.

12. Belay system according to claim 11, wherein the safety device is chosen from a belay device, a clamp, a lanyard or a pulley.

13. Carabiner comprising:
a body,
a gate fitted able to rotate on a first end of the body between a closed position and an open position of the carabiner, the gate being in contact with a second end of the body when the carabiner is in the closed position,
a confinement element configured to form a first stop and a second stop salient from the body, the confinement element being fitted removable with respect to the body, the confinement element being fixed to the body by a first fastener and a second fastener,
a joining part connecting the first fastener to the second fastener to define a separating distance between the first stop and the second stop, the joining part being pressed against the body, the body, the gate and the joining part defining a carabiner with a single central ring,
wherein the first fastener and second fastener each define a through hole collaborating with first and second connection parts chosen from screws, rivets or crimp pins to close the first and second fasteners.

14. Belay system comprising a carabiner according to claim 13 and a safety device.

15. Belay system according to claim 14, wherein the safety device is chosen from a belay device, a clamp, a lanyard or a pulley.

16. Method for installing a safety device on a carabiner, comprising the following steps:
providing a safety device,
providing a carabiner comprising:
a body,
a gate fitted able to rotate on a first end of the body between a closed position and an open position of the carabiner, the gate being in contact with a second end of the body when the carabiner is in the closed position, and
a confinement element, the confinement element having a first fastener, a second fastener and a joining part, the first or second fastener being fixed to the body of the carabiner,
inserting the body of the carabiner in a connection hole of the safety device until a work area is reached,
fixing the other of the first or second fastener on the body of the carabiner, the first and second fastener defining first and second stops at the ends of the work area, the first and second fasteners being secured to one another by the joining part pressing on the body, the joining part defining a separating distance between the first stop and the second stop, the first stop and the second stop being salient from the body,
wherein, in a section plane, the first fastener and/or second fastener completely surround the body such that the first fastener and/or second fastener form a ring around a section of the body, and
wherein the body, the gate and the joining part defining a carabiner with a single central ring.

17. Method for installing a safety device on a carabiner, comprising the following steps:
providing a safety device,
providing a carabiner comprising:
a body,
a gate fitted able to rotate on a first end of the body between a closed position and an open position of the carabiner, the gate being in contact with a second end of the body when the carabiner is in the closed position, and
a confinement element, the confinement element having a first fastener, a second fastener and a joining part, the first or second fastener being fixed to the body of the carabiner,
inserting the body of the carabiner in a connection hole of the safety device until a work area is reached,
fixing the other of the first or second fastener on the body of the carabiner, the first and second fastener defining first and second stops at the ends of the work area, the first and second fasteners being secured to one another by the joining part pressing on the body, the joining part defining a separating distance between the first stop and the second stop, the first stop and the second stop being salient from the body,
wherein the second fastener is fitted removable with respect to the first fastener and with respect to the joining part, and
wherein the body, the gate and the joining part defining a carabiner with a single central ring.

18. Method for installing a safety device on a carabiner, comprising the following steps:
providing a safety device,
providing a carabiner comprising:
a body,
a gate fitted able to rotate on a first end of the body between a closed position and an open position of the carabiner, the gate being in contact with a second end of the body when the carabiner is in the closed position, and
a confinement element, the confinement element having a first fastener, a second fastener and a joining part, the first or second fastener being fixed to the body of the carabiner, inserting the body of the carabiner in a connection hole of the safety device until a work area is reached, fixing the other of the first or second fastener on the body of the carabiner, the first and second fastener defining first and second stops at the ends of the work area, the first and second fasteners being secured to one another by the joining part pressing on the body, the joining part defining a separating distance between the first stop and the second stop, the first stop and the second stop being salient from the body, wherein the first fastener and second fastener each define a through hole collaborating with first and second connection parts chosen from screws, rivets or crimp pins to close the first and second fasteners, and wherein the body, the gate and the joining part defining a carabiner with a single central ring.

\* \* \* \* \*